(12) United States Patent
Liu et al.

(10) Patent No.: US 11,533,228 B2
(45) Date of Patent: Dec. 20, 2022

(54) METHOD FOR INFORMATION CONFIGURATION, APPARATUS, ELECTRONIC DEVICE, STORAGE MEDIUM AND PROGRAM PRODUCT

(71) Applicant: HONG KONG SUNSTAR TECHNOLOGY CO., LIMITED, Hong Kong (CN)

(72) Inventors: Fuyi Liu, Hong Kong (CN); Yihao Peng, Hong Kong (CN); Lichun Guo, Hong Kong (CN); Wen He, Hong Kong (CN)

(73) Assignee: HONG KONG SUNSTAR TECHNOLOGY CO., LIMITED, Hong Kong (CN)

( * ) Notice: Subject to any disclaimer, the term of this patent is extended or adjusted under 35 U.S.C. 154(b) by 0 days.

(21) Appl. No.: 17/386,327

(22) Filed: Jul. 27, 2021

(65) Prior Publication Data
US 2021/0359909 A1 Nov. 18, 2021

Related U.S. Application Data

(63) Continuation of application No. PCT/CN2018/117640, filed on Nov. 27, 2018.

(51) Int. Cl.
*G06F 15/177* (2006.01)
*H04L 41/0823* (2022.01)
*H04L 41/0853* (2022.01)
*H04L 41/08* (2022.01)
*H04L 41/12* (2022.01)

(52) U.S. Cl.
CPC ...... *H04L 41/0823* (2013.01); *H04L 41/0853* (2013.01); *H04L 41/0889* (2013.01); *H04L 41/12* (2013.01)

(58) Field of Classification Search
CPC . H04L 41/0853; H04L 41/0889; H04L 41/12; H04L 41/0823
USPC ........................................ 709/220, 222, 223
See application file for complete search history.

(56) References Cited

U.S. PATENT DOCUMENTS

| | | | | |
|---|---|---|---|---|
| 6,834,298 | B1 * | 12/2004 | Singer ..................... | H04L 41/12 709/224 |
| 7,818,336 | B1 * | 10/2010 | Amidon ................ | G06F 16/951 707/769 |
| 2004/0205419 | A1 * | 10/2004 | Liang .................... | H04L 63/145 714/57 |
| 2007/0206514 | A1 * | 9/2007 | Onishi .................. | H04L 41/044 370/254 |
| 2012/0215359 | A1 * | 8/2012 | Michael ................. | G06F 1/206 700/275 |
| 2016/0345176 | A1 * | 11/2016 | DeWitt ................. | H04W 64/00 |

(Continued)

FOREIGN PATENT DOCUMENTS

| CN | 1614937 A | 5/2005 |
|---|---|---|
| CN | 1905475 A | 1/2007 |

(Continued)

*Primary Examiner* — Lan Dai T Truong

(57) ABSTRACT

A method for information configuration, an apparatus, an electronic device, a storage medium and a program product. By searching for a computing device within a searching range of devices, and sending device configuration information to a searched computing device, the cost of human resources is reduced and the configuration efficiency of computing devices is improved.

20 Claims, 4 Drawing Sheets

```
┌─────────────────────────────────────────────┐ ─ S102
│   Searching for a computing device          │
│   within a searching range of devices       │
└─────────────────────────────────────────────┘
                      │
                      ▼
┌─────────────────────────────────────────────┐ ─ S104
│   Sending device configuration              │
│   information to a searched computing device│
└─────────────────────────────────────────────┘
```

(56) References Cited

U.S. PATENT DOCUMENTS

| | | | |
|---|---|---|---|
| 2018/0173176 A1* | 6/2018 | Locatelli | G06F 16/951 |
| 2019/0046379 A1* | 2/2019 | Constant | A61B 5/1115 |
| 2020/0134087 A1* | 4/2020 | Holub | G06F 16/3323 |
| 2020/0159981 A1* | 5/2020 | DiCorpo | G06F 30/392 |

FOREIGN PATENT DOCUMENTS

| | | |
|---|---|---|
| CN | 101163035 A | 4/2008 |
| CN | 103441876 A | 12/2013 |
| CN | 103905429 A | 7/2014 |
| CN | 104735260 A | 6/2015 |

* cited by examiner

METHOD FOR INFORMATION CONFIGURATION, APPARATUS, ELECTRONIC DEVICE, STORAGE MEDIUM AND PROGRAM PRODUCT

CROSS-REFERENCE TO RELATED APPLICATIONS

This application is a continuation of International Application No. PCT/CN2018/117640, filed on Nov. 27, 2018, which is hereby incorporated by reference in its entirety.

TECHNICAL FIELD

The present application relates to the field of data processing technologies, and in particular, to a method for information configuration, an apparatus, an electronic device, a storage medium and a program product.

BACKGROUND

With the development of data technology and the progress of society, more people pay attention to performing data processing through computing devices to obtain digital certificates. At the beginning of the computing device configuration, a computing device needs to be deployed and configured.

At present, at an initial stage of the computing device deployment, a user usually actively operate the computing device to search for a computing device, and then the searched computing device is manually configured, and in practical implementation, the user needs to keep repeating the two steps until the configuration of all computing devices are completed.

The implementation of the existing configuration method for computing devices depends on manual operations of users, which wastes the cost of human resources and has low configuration efficiency.

SUMMARY

Embodiments of the present disclosure provide a method for information configuration, an apparatus, an electronic device, a storage medium and a program product, to reduce the cost of human resources and improve configuration efficiency of computing devices.

In a first aspect, an embodiment of the present disclosure further provides a method for information configuration, including:

searching for a computing device within a searching range of devices; and sending device configuration information to a searched computing device.

In a possible design, the searching for a computing device within a searching range of devices includes:

searching for the computing device within the searching range of devices according to a preset time interval.

In a possible design, the searching for a computing device within a searching range of devices includes:

searching for the computing device within the searching range of devices until a preset terminating condition is satisfied.

In a possible design, the preset terminating condition includes at least one of the following:

all computing devices within the searching range of devices are obtained;

a search-terminating instruction is received; and a total searching duration is reached.

In a possible design, the sending device configuration information to a searched computing device includes:

remotely accessing the computing device, and sending the device configuration information to the computing device through the remote access.

In a possible design, the remotely accessing the computing device includes:

establishing a remote access connection with the computing device according to identification information of the computing device, where the identification information uniquely identifies one computing device.

In a possible design, the identification information includes: an Internet protocol (IP) address.

In a possible design, the sending device configuration information to a searched computing device includes:

writing the device configuration information into an operating system of the computing device.

In a possible design, the writing the device configuration information into an operating system of the computing device includes:

calling a simulated Web browser, and writing the device configuration information into the operating system of the computing device.

In a possible design, the device configuration information includes at least one of the following: a data processing address, a data processing account, a data processing password, a data processing difficulty level and a fan speed.

In a possible design, the searching range of devices includes: a searching range of an Internet protocol (IP) address of the computing device.

In a second aspect, an embodiment of the present disclosure further provides an apparatus for information configuration, including:

a searching module, configured to search for a computing device within a searching range of devices; and a sending module, configured to send device configuration information to a searched computing device.

In a possible design, the searching module is specifically configured to:

search for the computing device within the searching range of devices according to a preset time interval.

In another possible design, the searching module is specifically configured to:

search for the computing device within the searching range of devices until a preset terminating condition is satisfied.

The preset terminating condition includes at least one of the following:

all computing devices within the searching range of devices are obtained;

a search-terminating instruction is received; and a total searching duration is reached.

In another possible design, the sending module is specifically configured to:

remotely access the computing device, and send the device configuration information to the computing device through the remote access.

In another possible design, the sending module is specifically configured to:

establish a remote access connection with the computing device according to identification information of the computing device, where the identification information uniquely identifies one computing device.

The identification information includes: an Internet protocol (IP) address.

In another possible design, the sending module is specifically configured to:

write the device configuration information into an operating system of the computing device.

In another possible design, the sending module is specifically configured to:

call a simulated Web browser, and write the device configuration information into the operating system of the computing device.

In an embodiment of the present disclosure, the device configuration information includes at least one of the following: a data processing address, a data processing account, a data processing password, a data processing difficulty level and a fan speed.

In an embodiment of the present disclosure, the searching range of devices includes: a searching range of an Internet protocol (IP) address of the computing device.

In a third aspect, an embodiment of the present disclosure further provides an electronic device, including: a memory, a transceiver and a processor, where the memory, the transceiver and the processor are connected through a bus;

the memory is configured to store computer programs;

the transceiver is configured to communicate with other devices; and the processor is configured to execute the computer programs to implement the method according to any one of the first aspect.

In a possible design, the processor is configured to search for a computing device within a searching range of devices; and the transceiver is configured to send device configuration information to a searched computing device.

In a possible design, the processor is specifically configured to:

search for the computing device within the searching range of devices according to a preset time interval.

In a possible design, the processor is specifically configured to:

search for the computing device within the searching range of devices until a preset terminating condition is satisfied.

In a possible design, the preset terminating condition includes at least one of the following:

all computing devices within the searching range of devices are obtained;

a search-terminating instruction is received; and a total searching duration is reached.

In a possible design, the transceiver is specifically configured to:

remotely access the computing device, and send the device configuration information to the computing device through the remote access.

In a possible design, the transceiver is specifically configured to:

establish a remote access connection with the computing device according to identification information of the computing device, where the identification information uniquely identifies one computing device.

In a possible design, the identification information includes: an Internet protocol (IP) address.

In a possible design, the transceiver is specifically configured to:

write the device configuration information into an operating system of the computing device.

In a possible design, the transceiver is specifically configured to:

call a simulated Web browser, and write the device configuration information into the operating system of the computing device.

In a possible design, the device configuration information includes at least one of the following: a data processing address, a data processing account, a data processing password, a data processing difficulty level and a fan speed.

In a possible design, the searching range of devices includes: a searching range of an Internet protocol (IP) address of the computing device.

In a fourth aspect, an embodiment of the present disclosure further provides a computer-readable storage medium storing a computer-executable instruction, where the computer-executable instruction is set to execute the above method for information configuration.

In a fifth aspect, an embodiment of the present disclosure further provides a computer program product including computer programs stored on a computer-readable storage medium, where the computer programs include computer instructions which, when being executed by a computer, cause the computer to execute the above method for information configuration.

In the above technical solutions provided by the embodiments of the present disclosure, when a computing device needs to be configured, a search for the computing device is automatically conducted within a searching range of devices, and device configuration information is automatically sent to a searched computing device. In this way, a searching and configuring process of the computing device can be automatically completed without manual operations to the computing device by users, which saves the cost of human resources, and can improve configuration efficiency compared with the method of manual processing by users.

BRIEF DESCRIPTION OF DRAWINGS

One or more embodiments are illustratively described with reference to corresponding drawings, the illustrative descriptions and the drawings do not constitute limitations to embodiments, elements with the same reference numerals are shown as similar elements in the drawings, which do not constitute a scale limitation, and where.

DESCRIPTION OF EMBODIMENTS

In order to understand the characteristics and technical contents of the embodiments of the present disclosure in more detail, the implementation of the embodiments of the present disclosure will be described in detail with reference to the accompanying drawings which are for reference only and are not used to limit the embodiments of the present disclosure. In the following technical description, for convenience of illustration, multiple details are set forth in order to provide a thorough understanding of the disclosed embodiments. However, one or more embodiments may still be implemented without these details. In other cases, in order to simplify the drawings, well-known structures and apparatuses may be displayed in a simplified form.

The method for information configuration, the electronic device, the computer-readable storage medium and the computer program product provided by the embodiments of the present disclosure intend to solve a problem of human resource waste and low configuration efficiency existing in the prior art, and provide the following solving ideas: by way of configuring a searching range of devices in computing devices, when a computing device needs to be configured, searches can be automatically performed within the searching range of devices and device configuration information is sent to a searched computing device to implement automatic configuration of the computing device.

An embodiment of the present disclosure provides a method for information configuration.

Figure 1:
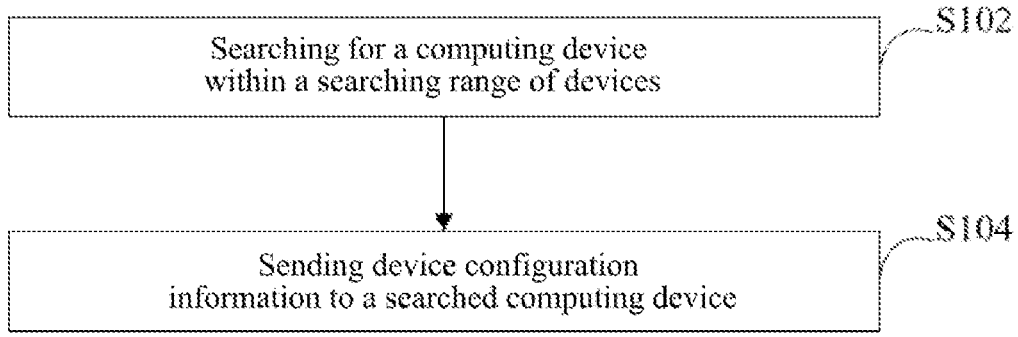
FIG. 1 is a schematic flowchart of a method for information configuration provided by an embodiment of the present disclosure.

FIG. 1 shows a schematic flowchart of a method for information configuration provided by an embodiment of the present disclosure, the method including following steps:

S102: searching for a computing device within a searching range of devices.

S104: sending device configuration information to a searched computing device.

First, the computing device will be illustrated. The computing device involved in the embodiments of the present disclosure is a device having the ability of computing and processing. And an executive device of the method for information configuration provided by the embodiments of the present disclosure can be a computing device, that is, in a possible implementation, the executive device of the method for information configuration can be integrated with the computing device. Or, an executive device of the method for information configuration can be a device-configuration device distinguished from the computing device, for example, can be a management server of the computing device.

Second, the searching range of devices and the device configuration information will be illustrated.

The searching range of devices can specifically be an Internet protocol (IP) address range of the computing device. That is, the searching range of devices can be an IP range of computing devices existing in a network. In an embodiment of the present disclosure, the searching range of devices can be preset in the executive device of the method for information configuration. When specifically the computing device needs to be configured, the searching step and the step of sending the configuration information mentioned above can be automatically executed.

The device configuration information is used to indicate information that the computing device submits a task to a management device, that is, configuration information required by the computing device to compute and process. If the computing device is not configured with the device configuration information, the execution of computing and processing will be influenced. For example, the device configuration information is used to indicate the information that the computing device needs to submit a task to the management device, which is specifically applied in a process that the computing device performs data processing to acquire a digital certificate, where operating parameters adopted by the computing device are configured.

In a specific implementation process, the device configuration information involved in the embodiments of the present disclosure can include, but is not limited to, at least one of the following information: a data processing address, a data processing account, a data processing password, a data processing difficulty level and a fan speed.

The data processing address can be an IP address of a computing device. Preferably, the data processing account and the data processing password can be set in pairs, which can improve safety of the computing device. In addition, the data processing difficulty level is used to measure a difficulty level of data processing, that is, to measure a difficulty level of computing a target solution required by the data processing. The embodiments of the present disclosure do not specifically limit a representing form of the data processing difficulty level, and for example, the data processing difficulty level can be represented through a way of numerical values, or can be represented through a way of levels, etc. The fan speed of the computing device is related to stable operation of the computing device. Since high-speed operation of the computing device will generate a large amount of heat, if the fan speed is low, overheat shutdown or damage may be caused to the computing device, thus influencing the stable operation; and if the fan speed is high, loud noise will be caused.

In the following, specific implementations of the above-mentioned steps of the embodiments of the present disclosure will be described in detail.

For the searching step in S102, searches can be performed according to a range indicated by a preset searching range. Specifically, if the searching range is the IP address range of the computing device, IP addresses of respective computing devices can be searched within the IP address range.

When the searching operation is specifically executed, a way of continuous searching can be adopted. That is, searches for computing devices are performed continuously and uninterruptedly within the above-mentioned searching range of devices. Or, a way of intermittent searching can also be adopted to search for computing devices.

Figure 2:
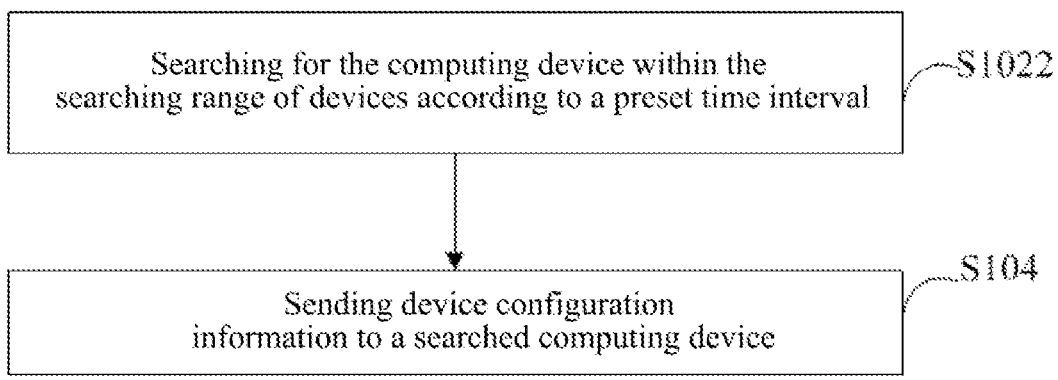
FIG. 2 is a schematic flowchart of another method for information configuration provided by an embodiment of the present disclosure.

FIG. 2 can be referred to, FIG. 2 shows a flowchart of another method for information configuration, and in the method, step S102 can specifically be:

S1022: searching for the computing device within the searching range of devices according to a preset time interval.

The time interval can be set according to needs, and can be set in a way of setting equivalent time intervals, at this time, which is equivalent to implement searches in a way of preset cycles. For example, searches for computing devices within the searching range for devices (preset IP address range) can be executed cyclically with every 15 minutes as a cycle.

Or, the time interval can be set as not exactly equal.

At this time, in an implementation scenario, the time interval can be preset in a way of a duration set. Specifically, the duration set can include at least two values, each value representing a duration that can be used to indicate an intermittent searching (in a possible implementation, each value can represent a duration of a continuous searching, and the meaning of the value can be indicated according to needs), and same values can exist in these values, but at least two unequal values shall exist in these values. In addition, when the time interval is preset in the way of the duration set, a way of the duration set guiding the searches can be further indicated or provide with default settings. For example, it can be indicated that one of the values is selected in turn (from front to back) as the interval duration (or searching duration), according to a sequence of respective values in the duration set; or, respective values in the duration set can be ranked, and one of the values can be selected in turn, according to a sequence after ranking, as the interval duration (or searching duration), where the ranking can be performed according to numerical values from large to small or from small to large.

In another implementation scenario, the time interval can be preset in a way of a moment sequence. Specifically, the moment sequence includes at least two moments, where in any two adjacent moments in the moment sequence, one moment is used to indicate to stop searching at the moment, and the other is used to indicate to start to execute searching at the moment. The embodiments of the present disclosure do not specifically limit whether a first moment in the moment sequence is used to indicate to stop searching or is used to indicate to start to execute searching.

In another implementation scenario, the time interval can be preset in a way of the moment sequence plus the default duration. For example, in a possible method, every moment in the moment sequence is used to indicate the moment to stop searching, at this time, a default intermittent duration can be set, and when the default intermittent duration is reached, the searching starts, until a next moment in the moment sequence is reached. Another possible implementation is in contrast, every moment in the moment sequence can also be used to indicate the moment to start to execute searching, and a default duration is used to indicate a duration of each search.

In addition, the time interval can be preset in a way of the moment sequence plus the duration sequence, at this time, corresponding relationships between a moment, duration and the meaning thereof need to be preset. The implementation method is as above, which will not be repeated.

Figure 3:
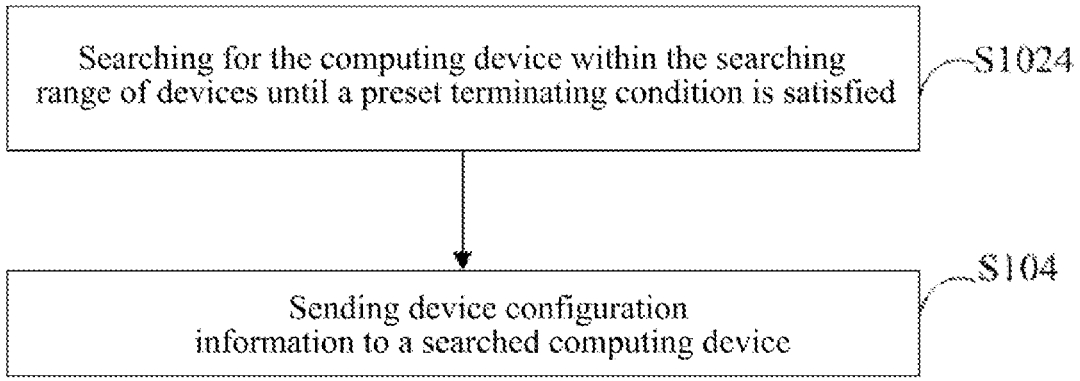
FIG. 3 is a schematic flowchart of yet another method for information configuration provided by an embodiment of the present disclosure.

In addition, an embodiment of the present disclosure further specifically provides a terminating condition for step S102, specifically, FIG. 3 can be referred to, and at this time, step S102 can include the following step:

S1024: searching for the computing device within the searching range of devices until a preset terminating condition is satisfied.

It needs to be noted that, the method shown in FIG. 3 can also be adaptive to the procedure shown in FIG. 1. That is, in the embodiments of the present disclosure, no matter the searching method of S102 is intermittently-executed searching or continuously-executed searching, the searching can both be terminated when the preset terminating condition is satisfied.

The preset terminating condition can be set according to needs, which can include, but is not limited to, at least one of the following:

all computing devices within the searching range of devices are obtained;

a search-terminating instruction is received; and a total searching duration is reached.

The implementation that all computing devices within the searching range of devices are obtained can be: no other computing devices can be searched within a specified continuous duration, where the specified duration can be set according to needs.

How to execute the method according to the total searching duration can be determined according to the way of searching. For example, if the way of continuous and uninterrupted searching is adopted, time reckoning is started from the moment when the searching starts to be executed, until a reckoned duration reaches the total searching duration, and then the searching stops. Or, if the way of intermittent searching is adopted, whether to include a duration of the intermittent searching can be specifically set, and then the searching is executed according to the above-mentioned method.

It needs to be noted that, the embodiments of the present disclosure do not limit a way of setting the preset terminating condition which, in practical implementation, can include but is not limited to the above ways, and user-defined preset terminating condition can be set according to self needs, to implement control of the searching process, with high flexibility.

In addition, considering that multiple computing devices may be searched in S102, execution of step S104 can include the following two ways of execution.

First, S104 is executed to searched computing devices in a unified way after the searching step in S102 is finished.

In a preferable implementation, if the way of intermittent searching is adopted in S102, in each time period of interrupting the searching, S104 is executed to the searched computing device resulted from the previous searching time period, which is helpful to improve configuration efficiency.

Second, in a searching step process of the S102, every time a computing device is searched, S104 is executed to the searched computing device. Considering that a possible duration of the searching process is long, thus, using this method can improve configuration efficiency to some extent.

On the basis of the above-mentioned implementations, the searched computing device is determined. At this time, when the step that sending the device configuration information to the computing device in S104 is executed, a connection to the computing device needs to be established.

At this time, an embodiment of the present disclosure provides a possible implementation: remotely accessing the computing device, and sending the device configuration information to the computing device through the remote access.

The remotely accessing the computing device is to establish a remote access connection with the computing device, which can be implemented by identification information of the computing device.

Figure 4:
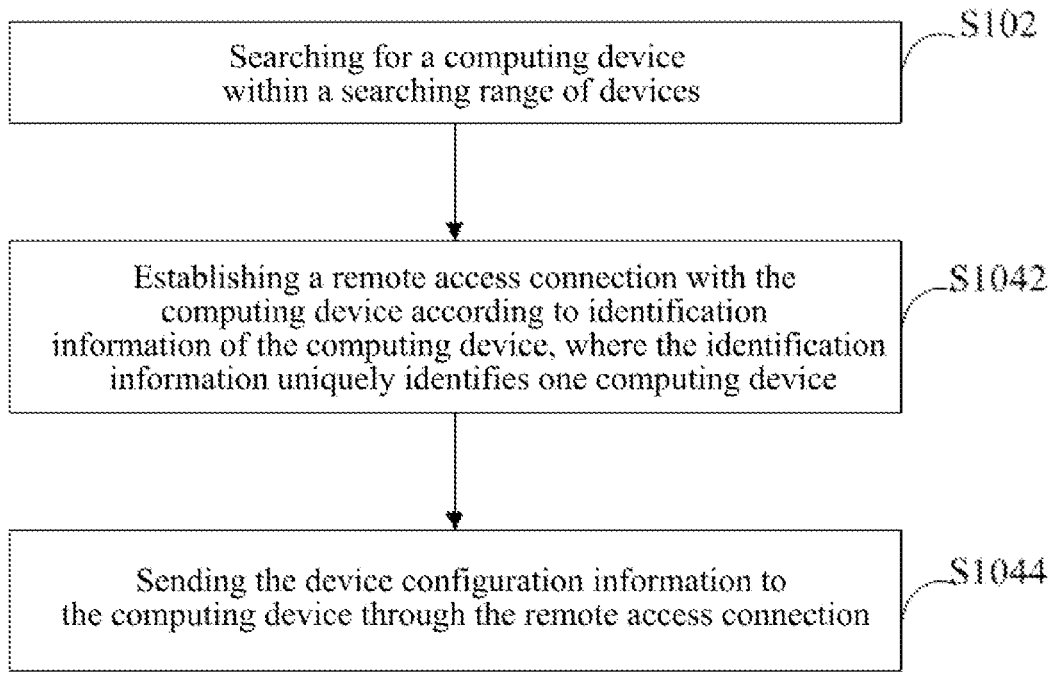
FIG. 4 is a schematic flowchart of yet another method for information configuration provided by an embodiment of the present disclosure.

At this time, referring to FIG. 4, step S104 may include the following steps:

S1042: establishing a remote access connection with the computing device according to identification information of the computing device, where the identification information uniquely identifies one computing device; and S1044: sending the device configuration information to the computing device through the remote access connection.

The identification information of the computing device involved in the embodiments of the present disclosure may include, but is not limited to: an IP address.

In an embodiment of the present disclosure, the sending the device configuration information to the computing device is to write the device configuration information to an operating system of the computing device, which is convenient for the computing device to adopt these device configuration information when computing and processing.

Figure 5:
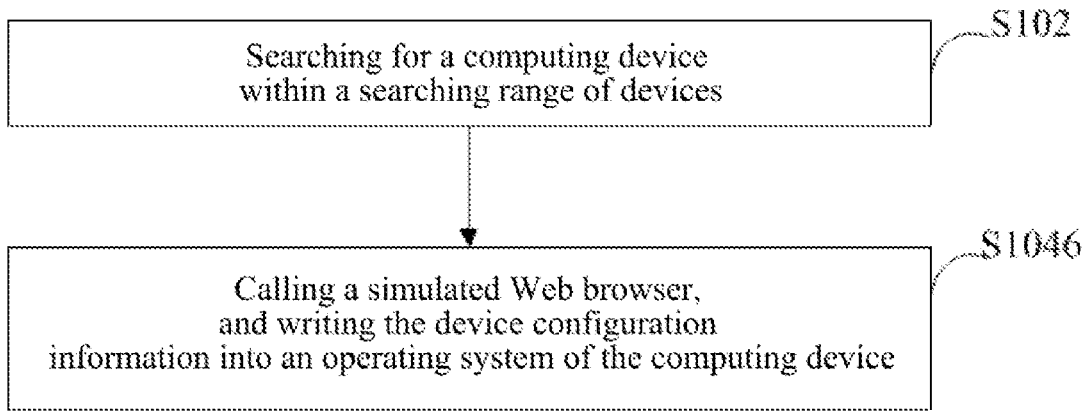
FIG. 5 is a schematic flowchart of yet another method for information configuration provided by an embodiment of the present disclosure.

The step can be implemented through a simulated World Wide Web (Web) browser. Specifically, referring to FIG. 5, S104 may include the following step:

S1046: calling a simulated Web browser, and writing the device configuration information into an operating system of the computing device.

The simulated web browser can be a callable plug-in program, in practical implementation, the program can be directly called, and the called simulated Web browser can establish a web connection with the computing device, thus the device configuration information is written into the operating system of the computing device through the web connection.

The embodiments of the present disclosure do not limit a specific position in the operating system of the computing device where the device configuration information is written in, for example, the written position can be a specified position in the operating system of the computing device used to store configuration information, or any positions that are readable in the operating system of the computing device.

Based on the above-mentioned method for information configuration, an embodiment of the present disclosure further provides an electronic device.

Figure 6:
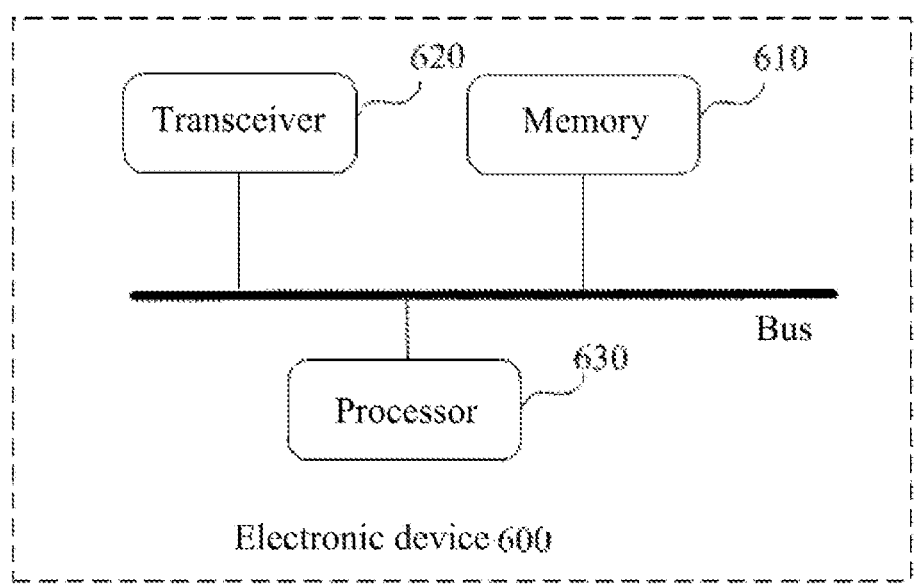
FIG. 6 is a structural schematic diagram of an electronic device provided by an embodiment of the present disclosure.

Referring to FIG. 6, an electronic device 600 includes: a memory 610, a transceiver 620 and a processor 630, where the memory 610, the transceiver 620 and the processor 630 are connected through a bus;

the memory 610 is configured to store computer programs;

the transceiver 620 is configured to communicate with other devices; and the processor 630 is configured to execute the computer programs to implement the method for information configuration as described in any implementation mentioned above.

In a possible design, the processor 630 is configured to search for a computing device within a searching range of devices; and the transceiver 620 is configured to send device configuration information to a searched computing device.

In a possible design, the processor 630 is specifically configured to:

search for the computing device within the searching range of devices according to a preset time interval.

In another possible design, the processor 630 is specifically configured to:

search for the computing device within the searching range of devices until a preset terminating condition is satisfied.

The preset terminating condition involved in the embodiments of the present disclosure includes at least one of the following:

all computing devices within the searching range of devices are obtained;

a search-terminating instruction is received; and a total searching duration is reached.

In a possible design, the transceiver 620 is specifically configured to:

remotely access the computing device, and send the device configuration information to the computing device through the remote access.

In another possible design, the transceiver 620 is specifically configured to:

establish a remote access connection with the computing device according to identification information of the computing device, where the identification information uniquely identifies one computing device.

The identification information includes: an Internet protocol (IP) address.

In another possible design, the transceiver 620 is specifically configured to:

write the device configuration information into an operating system of the computing device.

Specifically, the transceiver 620 is specifically configured to:

call a simulated Web browser, and write the device configuration information into an operating system of the computing device.

In addition, the device configuration information involved in the embodiments of the present disclosure can include, but is not limited to, at least one of the following: a data processing address, a data processing account, a data processing password, a data processing difficulty level and a fan speed.

In addition, the searching range of devices involved in the embodiments of the present disclosure includes, but is not limited to: a searching range of an Internet protocol (IP) address of the computing device.

In the embodiments of the present disclosure, logic instructions in the above memory 610 can be implemented in a form of a software functional unit, and when sold or used as independent products, can be stored in a computer-readable storage medium.

As a computer-readable storage medium, the memory 610 can be configured to store software programs, computer-executable programs, such as program instructions/modules corresponding to the method in the embodiments of the present disclosure. The processor 630 executes functional applications and data processing by running software programs, instructions and modules stored in the memory 610, that is, to implement the method for information configuration in the embodiments of the above method.

The memory 610 may include a program-storage section and a data-storage section, where the program-storage section can store an operating system, an application program required by at least one function; the data-storage section can store data created according to the usage of a terminal device, etc. In addition, the memory 610 may include a high-speed random access memory, and may also include a non-volatile memory.

In the embodiments of the present disclosure, a number of the processor 630 can be one or more, and the processor 630 can also be called as a processing unit, which can implement some control functions. The processor 630 can be a general processor or a special processor, etc.

In an optional design, the processor 630 can store instructions, and the instructions are runnable on the processor to cause the electronic device 600 to execute the method for information configuration as described in the above method embodiments.

In yet another possible design, the electronic device 600 can include a circuit, the circuit being able to implement the function of sending or receiving or communicating in the above method embodiments.

In the embodiments of the present disclosure, a number of the transceiver 620 can be one or more, and the transceiver 620 can be called as a transceiver unit, a transceiver machine, a transceiver circuit, or a transceiver etc., which is configured to implement the sending and receiving functions of the electronic device 600.

If the electronic device 600 is configured to implement operations corresponding to the method for information configuration in the embodiments shown in FIG. 1, for example, the operation can be that the transceiver 620 sends the device configuration information to the searched computing device. The transceiver 620 can further complete other corresponding communication functions.

Specific processing of respective components can be referred to in related descriptions of the above embodiments.

The processor 630 and the transceiver 620 described in the embodiments of the present disclosure can be implemented in an integrated circuit (IC), a simulated IC, a radio frequency integrated circuit RFIC, a hybrid signal IC, an application specific integrated circuit (ASIC), a printed circuit board (PCB), an electronic device, etc. The processor and the transceiver can be manufactured by using various IC process technologies, for example, complementary metal oxide semiconductor (CMOS), nMetal-oxide-semiconductor (NMOS), positive channel metal oxide semiconductor (PMOS), bipolar junction transistor (BJT), bipolar CMOS (BiCMOS), silicon-germanium (SiGe), gallium arsenide (GaAs), etc.

Optionally, the electronic device 600 can be an independent device or can be a part of a large device. For example, the electronic device 600 can be integrated into a computing device.

Figure 7:
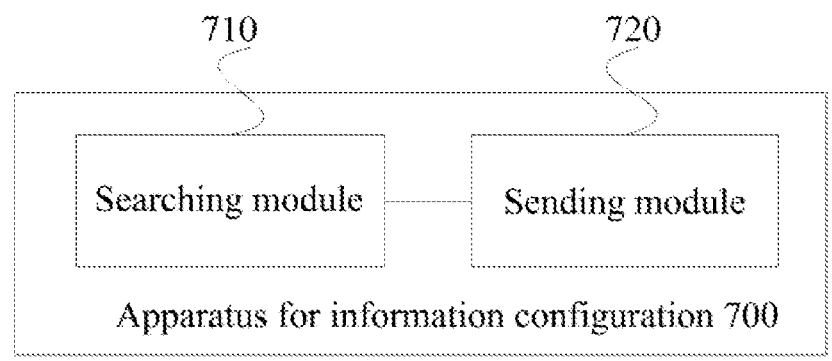
FIG. 7 is a structural schematic diagram of an apparatus for information configuration provided by an embodiment of the present disclosure.

In addition, an embodiment of the present disclosure further provides an apparatus for information configuration. Referring to FIG. 7, an apparatus 700 for information configuration includes:

a searching module 710, configured to search for a computing device within a searching range of devices; and a sending module 720, configured to send device configuration information to a searched computing device.

In a possible design, the searching module 710 is specifically configured to:

search for the computing device within the searching range of devices according to a preset time interval.

In another possible design, the searching module 710 is specifically configured to:

search for the computing device within the searching range of devices until a preset terminating condition is satisfied.

The preset terminating condition includes at least one of the following:

all computing devices within the searching range of devices are obtained;

a search-terminating instruction is received; and a total searching duration is reached.

In another possible design, the sending module 720 is specifically configured to:

remotely access the computing device, and send the device configuration information to the computing device through the remote access.

In another possible design, the sending module 720 is specifically configured to:

establish a remote access connection with the computing device according to identification information of the computing device, where the identification information uniquely identifies one computing device.

The identification information includes: an Internet protocol (IP) address.

In another possible design, the sending module 720 is specifically configured to:

write the device configuration information into an operating system of the computing device.

In another possible design, the sending module 720 is specifically configured to:

call a simulated Web browser, and write the device configuration information into an operating system of the computing device.

In an embodiment of the present disclosure, the device configuration information includes at least one of the following: a data processing address, a data processing account, a data processing password, a data processing difficulty level and a fan speed.

In an embodiment of the present disclosure, the searching range of devices includes: a searching range of an Internet protocol (IP) address of the computing device.

It should be noted that, in an embodiment of the present disclosure, no matter in which aspect, such as a method aspect and an apparatus aspect, etc., the data processing described in an embodiment of the present disclosure can include at least one of setting, calculation, judging, transmission, storage, management, etc. based on or of data.

As an embodiment, the data processing can be data processing related to digital certificate and performed by the data processing apparatus, where the digital certificate can be obtained by the data processing, and the data processing apparatus can be a digital certificate processing apparatus.

When the digital certificate is related to digital currency or is embodied as digital currency, the digital certificate processing apparatus can be a digital currency data processing machine, where the digital currency can be a cryptocurrency such as bitcoin.

In addition, an embodiment of the present disclosure provides a computer-readable storage medium, storing a computer-executable instruction, and the computer-executable instruction is used to execute the above method for information configuration.

An embodiment of the present disclosure further provides a computer program product, the computer program product including computer programs stored on a computer-readable storage medium, where the computer programs include computer instructions which, when executed by a computer, cause the computer to execute the above method for information configuration.

The computer-readable storage medium can be a transient computer-readable storage medium or a non-transient computer readable storage medium.

The technical solution of the embodiment of the present disclosure can be embodied in a form of software product, where the computer software product is stored in a storage medium, including one or more instructions being used to cause a computer device (can be a personal computer, a server, or a network device, etc.) to execute all of or part of steps of the method according to the embodiments of the present disclosure. And the above-mentioned storage medium can be various media able to store program codes such as a non-transient storage medium, including: a U disk, a mobile hard disk, a read-only memory (ROM), a random access memory (RAM), a magnetic disk or an optical disk, etc., and can also be a transient storage medium.

When used in embodiments of the present disclosure, although the terms "first", "second", etc., may be used in embodiments of the present disclosure to describe various elements, these elements should not be limited by these terms. These terms are only used to distinguish one element from another. For example, without changing the meaning of the description, a first element can be called a second element, and a second element can be called a first element as long as all occurrences of "first element" are renamed uniformly and all occurrences of "second element" are renamed uniformly. The first element and the second element are both elements, but may not be same elements.

The words used in the embodiments of the present disclosure are only used to describe the embodiments and are not used to limit the claims. As used in the description of the embodiments and claims, the singular forms "a", "an" and "the" are intended to include the plural forms as well, unless the context clearly indicates otherwise. Similarly, the term "and/or" as used in embodiments of the present disclosure is meant to include any and all possible combinations of one or more associated listings. In addition, when used in embodiments of the present disclosure, the term "comprise" and its variants "comprises" and/or "comprising" refer to the presence of stated features, integral, steps, operations, elements, and/or components, but do not exclude one or more other features, integral, steps, operations, elements and/or components.

Various aspects, implementations, realizations or features in the described embodiments can be used alone or in any combination. Various aspects described in the embodiments can be implemented by software, hardware, or a combination of software and hardware. The described embodiments may also be embodied by a computer-readable medium storing computer-readable codes including instructions executable by at least one computing device. The computer-readable medium can be associated with any data storage device capable of storing data that is readable by a computer system. Examples of computer-readable media may include read-only memory, random access memory, CD-ROM, HDD, DVD, magnetic tape, and optical data storage devices etc. The computer-readable medium can also be distributed in computer systems connected through a network, so that the computer-readable code can be stored and executed in a distributed manner.

The above technical descriptions can be made with reference to the accompanying drawings, which form a part of embodiments of the present disclosure, and in which implementations according to the described embodiments are shown by way of description. Although these embodiments are described in detail enough to enable those of skills in the art to implement the embodiments, but the embodiments are non-restricted; in this way other embodiments can be used and changes are allowed without departing from the scope of the described embodiments. For example, an order of operations described in the flowchart is non-restricted, so an order of two or more operations illustrated in and described according to the flowchart can be changed according to several embodiments. As another example, in several embodiments, one or more operations illustrated in the flowchart and described according to the flowchart are optional or can be deleted. In addition, some steps or functions may be added to the disclosed embodiments, or more than two steps may be replaced in sequence. All such variations are considered to be included in the disclosed embodiments and the claims.

In addition, terminology is used in the above technical descriptions to provide a thorough understanding of the described embodiments. However, too much detail is not required to implement the described embodiments. Therefore, the above description of embodiments has been presented for illustration and description. The embodiments presented in the above description and the examples disclosed according to these embodiments are provided separately to add context and help to understand the described embodiments. The above description is not intended to be exhaustive or to limit the described embodiments to the precise form of the disclosure. According to the above teaching, several modifications, alternative applications and variations are possible. In some cases, well-known processing steps are not described in detail to avoid unnecessarily affecting the described embodiments.

What is claimed is:

1. A method for information configuration, comprising:
   searching, by a first computing device, for a second computing device within a searching range of devices; and
   automatically sending, by the first computing device, device configuration information to a searched second computing device;
   wherein the first computing device is integrated with the second computing device or the first computing device is a computing device different from the second computing device, and
   wherein the device configuration information comprises a data processing difficulty level, wherein the data processing difficulty level is used to measure a difficulty level of computing a target solution required by the data processing, and enable the second computing device to compute and process according to the difficulty level.

2. The method according to claim 1, wherein the searching, by the first computing device, for the second computing device within the searching range of devices comprises:
   searching, by the first computing device, for the second computing device within the searching range of devices according to a preset time interval.

3. The method according to claim 2, wherein the searching, by the first computing device, for the second computing device within the searching range of devices comprises:
   searching, by the first computing device, for the second computing device within the searching range of devices until a preset terminating condition is satisfied.

4. The method according to claim 3, wherein the preset terminating condition comprises at least one of the following:
   all second computing devices within the searching range of devices are obtained;
   a search-terminating instruction is received; and
   a total searching duration is reached.

5. The method according to claim 1, wherein the automatically sending, by the first computing device, the device configuration information to the searched second computing device comprises:
   remotely accessing, by the first computing device, the second computing device, and sending the device configuration information to the second computing device through the remote access.

6. The method according to claim 5, wherein the remotely accessing, by the first computing device, the second computing device comprises:
   establishing, by the first computing device, a remote access connection with the second computing device according to identification information of the second computing device, wherein the identification information uniquely identifies one second computing device and comprises: an Internet protocol (IP) address.

7. The method according to claim 1, wherein the automatically sending, by the first computing device, the device configuration information to the searched second computing device comprises:
   calling, by the first computing device, a simulated Web browser, and writing the device configuration information into an operating system of the second computing device.

8. The method according to claim 1, wherein the device configuration information further comprises at least one of the following: a data processing account, a data processing password, a data processing address, and a fan speed.

9. The method according to claim 1, wherein the searching range of devices comprises: a searching range of an Internet protocol (IP) address of the second computing device.

10. A non-transitory computer-readable storage medium storing computer-executable instructions, wherein the computer-executable instructions are set to execute the method according to claim 1.

11. An apparatus for information configuration, comprising: a memory, a transceiver and a processor, wherein the memory, the transceiver and the processor are connected through a bus, the memory is configured to store computer programs, and the transceiver is configured to communicate with other devices;
  the processor is configured to execute the computer programs to search for a computing device within a searching range of devices; and
  the transceiver is configured to automatically send device configuration information to a searched computing device;
  wherein the device configuration information comprises a data processing difficulty level, wherein the data processing difficulty level is used to measure a difficulty level of computing a target solution required by the data processing, and enable the second computing device to compute and process according to the difficulty level.

12. The apparatus according to claim 11, wherein the processor is further configured to:
  search for the computing device within the searching range of devices according to a preset time interval.

13. The apparatus according to claim 12, wherein the processor is further configured to:
  search for the computing device within the searching range of devices until a preset terminating condition is satisfied.

14. The apparatus according to claim 13, wherein the preset terminating condition comprises at least one of the following:
  all computing devices within the searching range of devices are obtained;
  a search-terminating instruction is received; and
  a total searching duration is reached.

15. The apparatus according to claim 11, wherein the transceiver is further configured to:
  remotely access the computing device, and send the device configuration information to the computing device through the remote access.

16. The apparatus according to claim 15, wherein the transceiver is further configured to:
  establish a remote access connection with the computing device according to identification information of the computing device, wherein the identification information uniquely identifies one computing device and comprises: an Internet protocol (IP) address.

17. The apparatus according to claim 11, wherein the transceiver is further configured to:
  write the device configuration information into an operating system of the computing device.

18. The apparatus according to claim 17, wherein the transceiver is specifically configured to:
  call a simulated Web browser, and write the device configuration information into the operating system of the computing device.

19. The apparatus according to claim 11, wherein the device configuration information further comprises at least one of the following: a data processing account, a data processing password, a data processing address, and a fan speed.

20. The apparatus according to claim 11, wherein the searching range of devices comprises: a searching range of an Internet protocol (IP) address of the computing device.

* * * * *